United States Patent [19]

Anderson et al.

[11] 4,101,180
[45] Jul. 18, 1978

[54] ROLLER ASSEMBLY

[75] Inventors: William B. Anderson, Oconomowoc; Julius J. Yulga, Milwaukee, both of Wis.

[73] Assignee: Rexnord Inc., Milwaukee, Wis.

[21] Appl. No.: 806,028

[22] Filed: Jun. 13, 1977

[51] Int. Cl.² .................................................. F16C 13/02
[52] U.S. Cl. ...................................... 308/20; 198/845; 277/53; 295/35; 308/36.1; 308/101; 308/187.1; 308/237 R
[58] Field of Search ................... 308/18, 20, 203–204, 308/36.1–36.5, 92, 94, 95, 97, 101, 22, 103, 106, 109, 187.1, 163, 113, 15, 114, 115, 237 R, 26, 187, 207 R; 198/845, 838; 277/53–57; 295/8, 35, 37, 46, 49, 50; 16/107; 193/37

[56] References Cited

U.S. PATENT DOCUMENTS

| | | | |
|---|---|---|---|
| 2,517,208 | 8/1950 | Hunt | 308/237 R X |
| 3,381,798 | 5/1968 | Kornylak | 308/20 X |
| 3,490,773 | 1/1970 | Dennison | 277/53 X |
| 4,049,308 | 9/1977 | Martin | 308/101 X |

*Primary Examiner*—Trygve M. Blix
*Assistant Examiner*—Douglas C. Butler
*Attorney, Agent, or Firm*—Rexnord Inc.

[57] ABSTRACT

A roller assembly for use on a conveyor chain to provide rolling support for the working run thereof includes a roller journaled on a mounting bushing and held thereon from axial displacement by a double sealing ring arrangement at each roller end face. The double sealing rings are arranged to provide a labyrinth seal to aid in the retention of lubricant within and the exclusion of contaminants from the assembly, and the inner ring of each pair also provides an axial thrust bearing surface for the roller. The sealing rings are preferably of L-shaped cross section and are adaptable for use with rollers of either metal or platic construction.

10 Claims, 6 Drawing Figures

ROLLER ASSEMBLY

BACKGROUND OF THE INVENTION

The present invention pertains generally to the art of endless chain conveyors and, more specifically, to conveyors of the type utilizing two parallel strands of chain with conveyor flights attached therebetween and supported for movement by a series of rollers mounted on each strand of chain. The invention herein relates particularly to roller assemblies for use in such conveyors.

A wide variety of chains and conveyor flights are known in the art because of the extremely wide range of materials which may be conveniently conveyed in this manner. One type of conveyor widely used to convey bulk materials is commonly known in the art as an apron conveyor or a pan conveyor. This type of conveyor utilizes a series of open-ended overlapping pans mounted between two parallel strands of chain to provide a continuous substantially flat conveying surface. The conveyor chains are supported by rollers which operate over a pair of rails along the conveyor path. The supporting rollers may be of the "inboard" type wherein they are mounted on the conveyor chain bushings between the chain sidebars, as shown for example in U.S. Pat. No. 3,331,490; or they may be of the "outboard" type wherein the rollers are mounted on the outside of the conveyor chain sidebars, most commonly in pairs on a shaft extending through the sidebars thereof, as shown for example in U.S. Pat. No. 2,517,208.

In apron conveyors using an outboard roller construction, the rollers are commonly made of cast iron and are provided with cylindrical through bores which are mounted for rotation on plain cylindrical iron or steel bushings. Pairs of bushings and rollers are mounted on ends of the shaft and outwardly of the respective chain sidebars, as is shown in the above mentioned U.S. Pat. No. 2,517,208. Preferably, some means of securing the bushings against rotation on the common shaft is used and thus the roller rotates on the bushing in the manner of a plain journal bearing. Square shaft ends and corresponding square bores in the bushings are an example of one means of preventing bushing rotation, such as shown in U.S. Pat. No. 3,214,008.

Such cast iron rollers have been widely accepted as inexpensive, strong and durable components in apron conveyors used to convey a wide variety of bulk materials, such as castings, sugar cane, solid waste, limestone, coal and other minerals and ores. Most of these materials are, however, dusty, dirty, or highly abrasive and these contaminants inevitably work their way during operation of the conveyor into the bearing areas between the rollers and bushings, resulting in wear and eventual failure of the roller assembly. The rollers may be provided with internal grease cavities or reservoirs which are periodically regreased via an external grease fitting and some of the foreign material will be purged in the regreasing process. However, not only is such purging less than completely effective, but the basic problem of immediate re-entry of contaminants remains.

An effective means of sealing the bearing area against contaminant entry has therefore been long sought in the art. Labyrinth seals of many types are well known in the bearing art, however, the complex constructions and high cost of these seals make them generally unsuitable for use in roller assemblies of the type disclosed herein.

U.S. Pat. No. 3,490,773 discloses a labyrinth seal for use in a cast iron roller of the type used in an outboard roller assembly of an apron conveyor. The labyrinth is comprised of two spaced rings, one fitted to the outside diameter of the bushing and the other to the inside diameter of a counterbore in the roller member. The two rings form a two-chamber labyrinth which, when filled with grease in the lubrication process, is intended to prevent the entry of contaminants from outside the assembly. However, since neither sealing ring is fitted tightly to the bushing or the roller, respectively, the resultant clearances in seal constructions of this type can allow "short circuiting" of the labyrinth and direct entry of contaminants along the bushing surface into the bearing area.

Seals of the general type heretofore described also exhibit two other deficiencies. First, loose fitting sealing rings must be retained in place by additional retaining means, such as a snap ring, thus adding to the complexity and cost of the assembly. Second, the lateral thrust loads often imposed on rollers in operation require a substantial thrust bearing surface which has been deficient or totally lacking in prior art constructions.

SUMMARY OF THE INVENTION

In the present invention, an effective labyrinth seal and thrust bearing surface are provided in a simple two piece assembly comprising, in the preferred embodiment, a pair of rings of L-shaped cross section mounted with a press fit on the bushing and the roller member, respectively. The tight press fits of the rings prevent short circuiting of the labyrinth passages by contaminants and also eliminate the need for separate seal retainers. The inner ring of each pair provides a large thrust bearing surface to absorb axial thrust loads. The seal is also adaptable for use in roller assemblies of plastic construction and with rollers incorporating antifriction bearings between the bushing and roller member.

DESCRIPTION OF THE PREFERRED EMBODIMENTS

Figure 1:
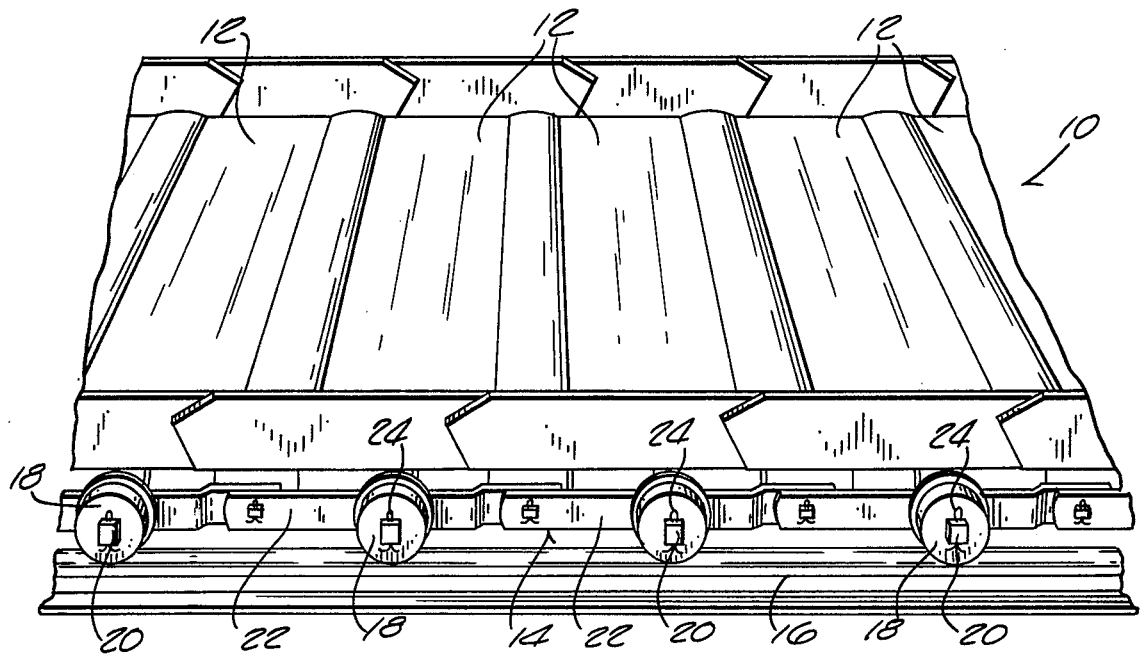
FIG. 1 is a perspective view of an apron conveyor on which roller assemblies of the present invention may be used.
Figure 2:
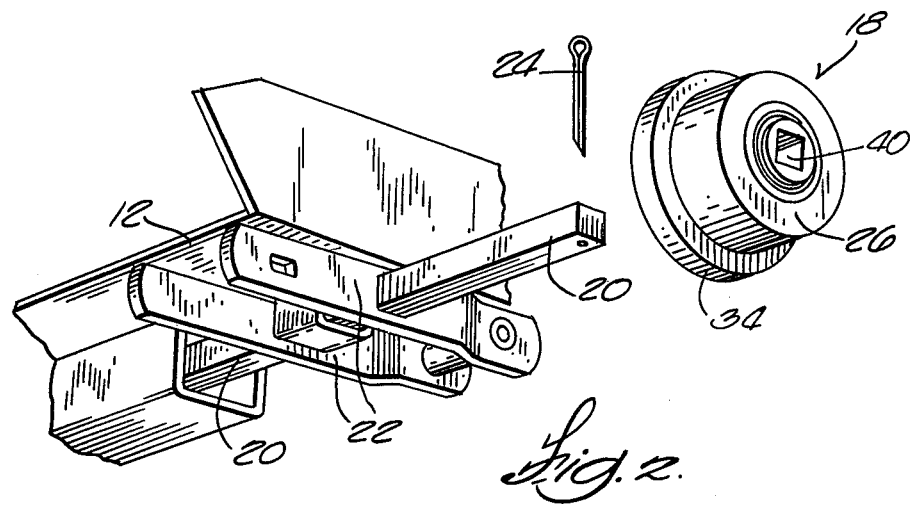
FIG. 2 is an enlarged perspective view of a single pan and conveyor chain link of FIG. 1 showing generally the mounting arrangement of a roller assembly thereon.

FIG. 1 shows the general arrangement of an apron conveyor 10 wherein a series of open-ended, overlapping pans 12 is mounted on a pair of spaced, parallel conveyor chains 14 (only the chain on the near side bearing shown in FIG. 1). The chains 14 are supported for travel over rails 16 by a series of roller assemblies 18 of the present invention. Referring also to FIG. 2, roller assemblies 18 are conveniently mounted in pairs on the ends of a stub shaft 20 which extends through holes in the sidebars 22 thereof. The roller assemblies 18 may be held on the shafts 20 in any suitable manner, such as with cotter pins 24.

Figure 3:
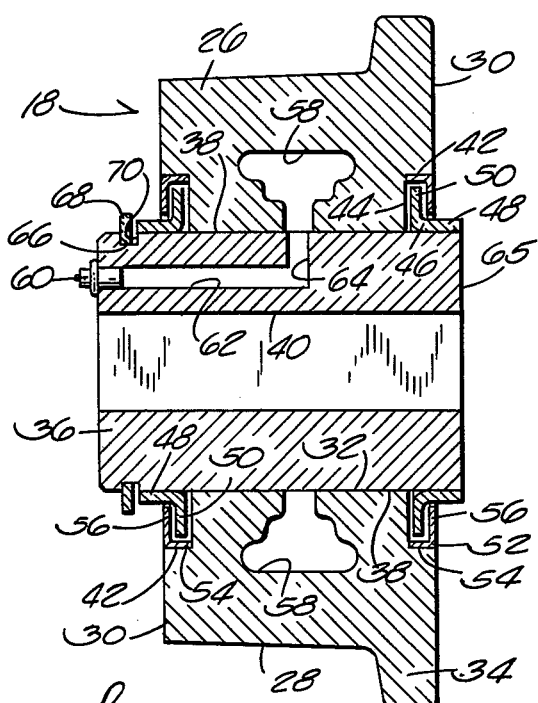
FIG. 3 is a cross sectional view through the center of a roller assembly of the preferred embodiment.
Figure 4:
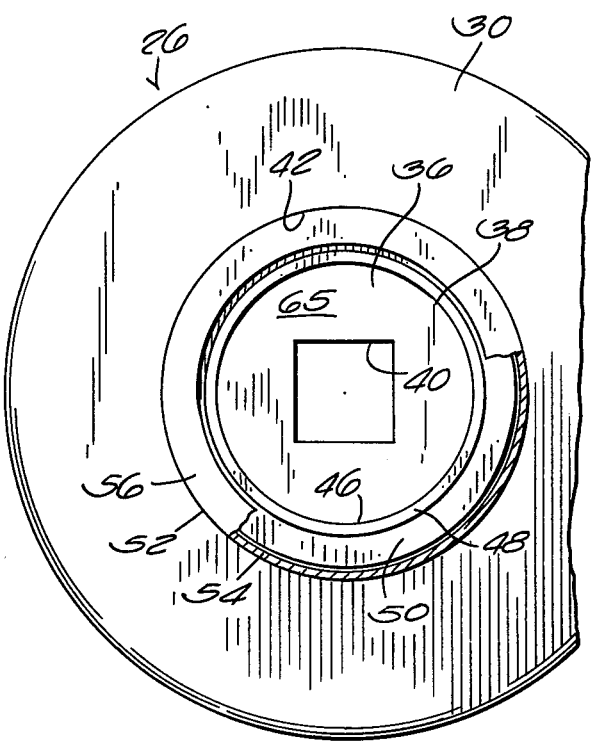
FIG. 4 is an end elevation of the roller assembly of FIG. 3.

In the preferred embodiment shown in FIGS. 3 and 4, the roller assembly 18 includes a roller member 26 having a cylindrical outer surface 28 between generally flat parallel end faces 30, and a cylindrical bore 32 extending therethrough. The roller member 26 also preferably includes a flange 34 extending radially outward from the outer surface 28 adjacent one of the end faces 30 to keep the apron conveyor 10 on the rails 16 over which it travels.

A bushing 36 having an outer cylindrical surface 38 is journaled in the bore 32 of the roller member for relative rotation therein. In practice, of course, the roller member 26 is adapted to roll over the supporting rail 16 and the bushing 36 is preferably held from rotating by use, for example, of a square shaft 20 and a corresponding square through bore 40 in the bushing. The roller member 26 and the bushing 36 are both commonly made of cast iron and the mating bearing surfaces on the bore 32 and the outer surface 38, respectively, are hardened to enhance the wear life.

Each end face 30 of the roller member is provided with a counterbore 42 having a cylindrical surface concentric with the bore 32 and an end wall 44 lying parallel to the end face 30. An inner sealing ring 46 of L-shaped cross section having an axially extending leg 48 and a radially extending leg 50 is pressed onto the outer surface 38 of each end of the bushing 36 and into the counterbores 42 in each end face 30. The inner sealing rings 46, which are preferably made of formed metal stampings, are pressed onto the bushing with a tight interference fit in the range of approximately 0.003 to 0.012 inch. This tight interference fit secures the roller member on the bushing against axial displacement and a slight clearance is provided between the radially extending leg 50 of each inner sealing ring and the corresponding end wall 44 of the counterbore. The clearance forms the inner passage of the labyrinth seal, as will be described in greater detail below, and defines the limits of axial movement of the roller member in either direction. The axial inner face of the radially extending leg 50 also provides a substantial thrust bearing surface against which the end wall 44 of the counterbore may bear when the roller member is displaced by an axial thrust load.

An outer sealing ring 52, also of L-shaped cross section, includes an axially extending leg 54 and a radially extending leg 56. In a manner similar to the inner sealing rings, each outer sealing ring 52 is preferably a formed metal stamping and is sized to be pressed with a tight interference fit into the counterbore 42 in each end face of the roller member. The axially extending leg 54 is preferably of a length equal to the depth of the counterbore 42, such that its inner edge abuts the end wall 44 of the counterbore and the radially extending leg 56 lies flush with the end face 30 of the roller member.

The respective radially extending legs 50 and 56 of the inner and outer sealing rings 46 and 52 are axially spaced and the clearance therebetween forms the outer passage of the labyrinth seal. These radially extending legs 50 and 56 are each respectively radially spaced from the axially extending legs 54 and 48 of the corresponding outer and inner sealing rings. Thus, proceeding outwardly from the bearing surface between the roller member and the bushing, a labyrinth seal of a generally U-shaped configuration is formed by the clearance between the counterbore end wall 44 and the radially extending leg 50 of the inner sealing ring 46, the space between the outer edge of said leg 50 and the axially extending leg 54 of the outer sealing ring 52, the clearance between the radially extending legs 50 and 56 of the inner and outer sealing rings, and the space between the edge of said leg 56 and the axially extending leg 48 of the inner sealing ring. In addition, the clearance between the radially extending legs 50 and 56 of the inner and outer sealing rings 46 and 52, respectively, is greater than the clearance between the radially extending leg 50 of the inner sealing ring and the counterbore end wall 44. In this manner, axial thrust loads are always taken by the inner sealing ring and never transmitted to the outer sealing ring. As a result, the press fit by which the outer sealing ring is held in the counterbore 42 need not be as tight as the press fit of the inner sealing ring on the bushing 36.

To provide an effective seal, a labyrinth must be kept filled with an appropriate lubricant, such as grease, and means for periodically purging contaminated lubricant from the labyrinth should also be provided. Thus, referring to FIG. 3, the roller member 26 is provided with and internal annular grease reservoir 58 having open communication with the bearing surfaces 32 and 38 of the roller member and bushing, respectively. Grease is supplied to the reservoir via an external grease fitting 60, an axial passage 62 in the bushing 36, and cross hole 64 in alignment with the reservoir opening. As grease is injected into the assembly, the reservoir 58 is filled and the excess grease is forced between the bearing surfaces 32 and 38, and into and through the labyrinth passages in both roller end faces. The labyrinths are thus kept filled with grease, which tends to work out in operation, and any contaminated grease is simultaneously purged from the passages. Alternately, grease may be supplied to the reservoir 58 from a grease fitting and supply passage in the roller member itself (not shown).

The bushing 36 has an axial length greater than the roller member 26 and extends axially beyond both end faces 30 thereof. On the end face 30 including the flange 34, the axially outer face 65 of the extended portion of the bushing 36 is adapted to abut the outer sidebar 22 of the conveyor chain 14 to space the roller member 26 therefrom and enable it to rotate without rubbing against the chain. The extended portion of the bushing on the roller end face 30 opposite the flange 34 may optionally be provided with an annular groove 66 into which an ordinary snap ring 68 is inserted as a safety measure to retain the inner sealing ring 46 should it be forced to loosen under an axial thrust overload or similar failure.

The outer ends of the axially extending legs 48 of inner sealing rings 46 are adapted to lie flush with the outer face 65 of the bushing and the inner face 70 of the annular groove 66, respectively. The faces 65 and 70 can thus be used as locators to establish the precise positioning of the inner sealing rings 46 on the bushing 36 to provide the exact clearances desired between the radially extending legs 50 and the ends walls 44 of the counterbores 42.

Figure 5:
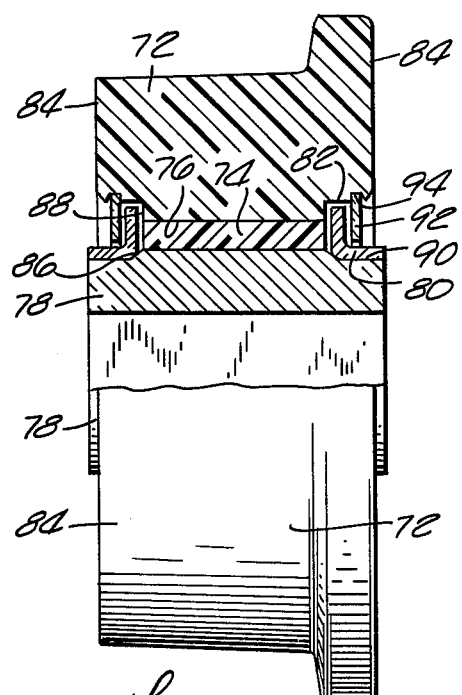
FIG. 5 is a partial cross sectional view of an alternate embodiment of the roller assembly of the present invention.

An alternate embodiment of the invention is shown in FIG. 5 where the roller member 72 is constructed of a non-metallic material, such as urethane. In addition, a plain cylindrical sleeve bearing 74 is mounted within the bore 76 in the roller member. The bearing may be of any of the many self-lubricating types known in the art and relubrication capability is therefore unnecessary.

The roller member and integrally mounted bearing are adapted to rotate on the bushing 78 in a manner similar to the assembly of the preferred embodiment of FIGS. 3 and 4. The roller assembly of FIG. 5 also includes a pair of inner sealing rings 80 pressed onto the bushing and into a counterbore 82 in each end face 84 of the roller member 72. However, the bushing 78 is provided with stop means in the form of an annular shoulder 86 positioned slightly axially outward of the end walls 88 of each counterbore 82. The shoulders 86 define bushing end portions 90 of reduced diameters, but slightly larger than the inside diameters of the axially extending legs of the inner sealing rings 80 within the limits of the desired interference fit, so that the inner sealing rings will engage the shoulders when pressed onto the bushing and accurately establish the desired spacing between the radially extending legs of said rings 80 and the respectively adjacent end walls 88 of the counterbore.

The outer sealing ring 92 may be of rectangular cross section and include only a radially extending leg which, due to much greater elasticity of the urethane roller member, can be conveniently snapped into an annular groove 94 in the counterbore 82. The same relative clearances are maintained between the inner and outer sealing rings and between the inner rings and the end wall of the counterbore as in the preferred embodiment, so that no thrust loads are transmitted to the outer sealing ring.

Figure 6:
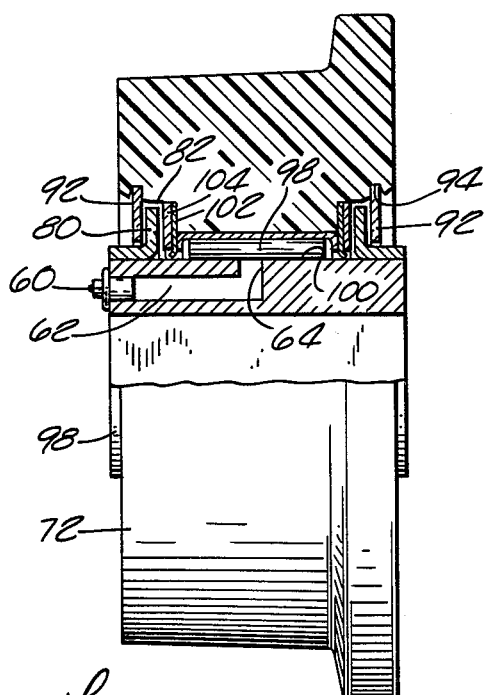
FIG. 6 is a partial cross sectional view of a second alternate embodiment of the roller assembly of the present invention.

In the second alternate embodiment shown in FIG. 6, several of the elements are the same as in the FIG. 5 embodiment and are, therefore, identically numbered. In this embodiment, however, an antifriction needle bearing 96 is secured within the bore of the roller member 72 for rotation therewith about the bushing 98. Bushing 98 is metal and preferably has a hardened outer surface 100 to provide a durable, long-wearing inner race for the needle bearing 96. In addition, lubrication must be provided for the bearing in the same manner as for the FIG. 3 preferred embodiment, to wit, via grease fitting 60, axial passage 62 and cross hole 64 in the bushing 98.

Interposed in the space between the radially extending leg of the inner sealing ring 80 and the end wall of the counterbore 82 is a supplemental sealing means in the form of an annular flexible wiping seal 102. Seal 102 is held in position by a backing ring 104 which is pressed into the counterbore 82. The free radially inner edge of the seal 102 provides full wiping contact with the surface 100 of the bushing 98 and serves to supplement the labyrinth seal both in the retention of lubricant within the bearing cavity and the exclusion of contaminants therefrom.

We claim:

1. A roller assembly comprising:
   (a) a roller member having an outer cylindrical rolling surface and substantially flat parallel end faces;
   (b) a cylindrical bore extending through said roller member;
   (c) a bushing journaled in said bore for relative rotational motion therein;
   (d) a counterbore in each end face lying concentric with said bore and having an end wall parallel to the end face;
   (e) a pair of inner sealing rings of L-shaped cross section, each having an axially extending leg and a radially extending leg and adapted to be pressed onto an end of said bushing and to be held thereon by an interference fit between the inside surface of said axially extending leg and the outer surface of said bushing;
   (f) said inner sealing rings each being disposed within one of said counterbores with the radially extending leg thereof parallel to and closely spaced from the end wall of said counterbore to limit axial movement of the roller member on the bushing and to provide therebetween an axial thrust bearing surface;
   (g) the outer edge of the radially extending leg of each inner sealing ring lying spaced from the surface of the counterbore;
   (h) outer sealing ring mounted within each counterbore and having a radially extending leg lying axially spaced from the radially extending leg of said inner sealing ring and radially spaced from the axially extending leg of said inner sealing ring; and,
   (i) the distance by which the radially extending legs of said inner sealing rings are spaced from the respective end walls of said counterbores is less than the distance by which the radially extending legs of said outer sealing rings are spaced from the respective radially extending legs of said inner sealing rings.

2. A roller assembly as defined in claim 1 wherein each of said outer sealing rings is of L-shaped cross section and includes an axially extending leg adapted to be pressed into said counterbore and to be held therein by an interference fit.

3. A roller assembly as defined in claim 2 wherein the axially extending leg of each outer sealing ring is disposed to extend inwardly into the space between the radially extending leg of the inner sealing ring and the surface of the counterbore.

4. A roller assembly as defined in claim 3 wherein the axially extending leg of each outer sealing ring abuts the end wall of the counterbore.

5. A roller assembly as defined in claim 1 wherein the outer cylindrical surface of said roller member is provided with an integral annular radial flange adjacent one end face thereof.

6. A roller assembly as defined in claim 1 including:
   (a) stop means on the outer surface of said bushing for each inner sealing ring;
   (b) said stop means being located axially outward of the end walls of said counterbores and engaged by each said ring when the same is pressed onto said bushing; and,
   (c) said stop means being axially spaced a distance sufficient to establish the desired spacing between the radially extending legs of said inner sealing rings and the respective end walls of said counterbores.

7. A roller assembly as defined in claim 6 wherein said stop means comprises an annular shoulder on each end of said bushing defining end portions of reduced diameters.

8. A roller assembly as defined in claim 1 including:
   (a) a lubricant reservoir within the roller member having open communication with the bore in said member; and,
   (b) a lubricant supply passage having an opening on the outside of said assembly and having communication with said lubricant reservoir.

9. A roller assembly as defined in claim 8 including antifriction bearing means mounted in the bore of said roller member for journaled support thereof on said bushing.

10. A roller assembly as defined in claim 9 including flexible sealing means mounted in each counterbore between the end wall thereof and said inner sealing ring, said sealing means each having a free radially inner edge in full wiping contact with said bushing.

* * * * *